Sept. 23, 1958 A. J. BRYANT 2,852,894
DEVICE FOR RADIALLY RELIEVING CUTTING TOOLS
Filed Nov. 18, 1955
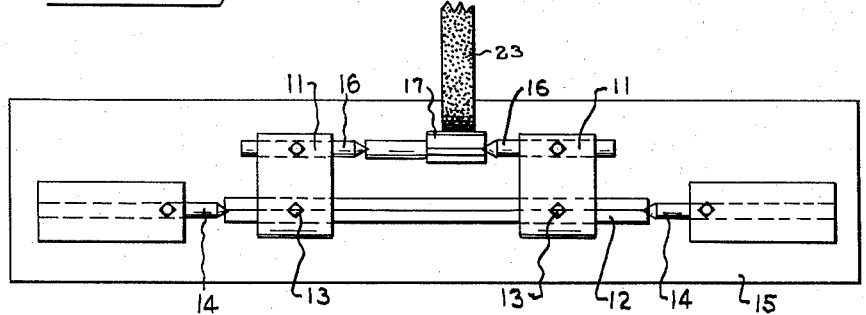
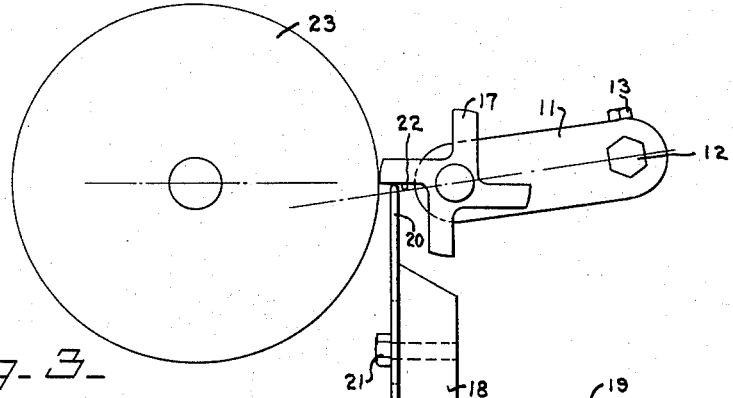
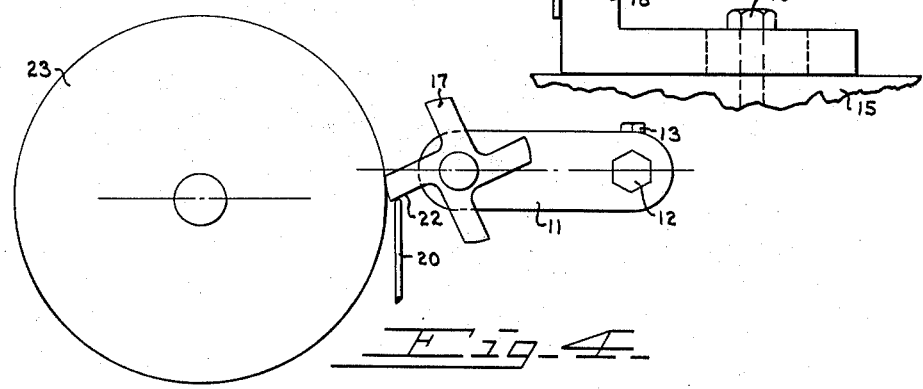
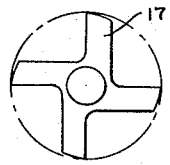
INVENTOR.
ANDREW J. BRYANT.
BY
ATTORNEY.

12 # United States Patent Office 2,852,894
Patented Sept. 23, 1958

2,852,894

DEVICE FOR RADIALLY RELIEVING CUTTING TOOLS

Andrew J. Bryant, Cincinnati, Ohio

Application November 18, 1955, Serial No. 547,750

2 Claims. (Cl. 51—97)

This invention relates to a new and novel method and device for radially relieving cutting tools. Heretofore, the back off or clearance on a cutting tool was ground as a flat and on small tools removed considerable of the supporting material in order for the tail to clear the work on which the tool was used. With my improved method and device, a cutting tool can be radially relieved to any desired drop which is generated on the cutting tool without the use of cams. The device automatically compensates for any error in flute spacing and generates a radial constant relief on spiral, helix or tapered tools with equal ease, thus permitting the maximum of supporting material to remain between the cutting edge and the flute. I have devised a novel method of generating a cutting tool about its axis as it is presented to the grinding wheel and at the same time changing the axis of the cutting tool in respect to the axis of the grinding wheel.

The object of my invention is to provide a cutting tool with a radially convex relief from the cutting edge to the flute whereby the radial relief will recede from the cutting edge.

A further object is the method employed to generate a radial convex relief.

My invention will be further readily understood from the following description and claims, and from the drawings, in which latter:

Fig. 1 is a plan view of the device in connection with a grinding wheel.

Fig. 2 is a diagrammatic view of the same with the cutting tool in position to start the grind.

Fig. 3 is a view similar to Fig. 2 showing the position of the cutting tool as the grind is completed.

Fig. 4 is a diagrammatic view of a finished cutting tool.

My improved device comprises a pair of holders 11 suitably supported on a hex bar 12 and held in adjusted position by means of cap screws 13. The bar 12 is supported by the centers 14 of any suitable supporting fixture 15. The holders 11 are provided with centers 16 for engaging and supporting a cutting tool 17 which it is desired to grind. However, any suitable supporting device may be used, such as a chuck, in cases where the cutting tool is not provided with centers.

The supporting fixture 15 is provided with a fulcrum supporting member 18 which is adjustable on the supporting fixture 15 by the means of a clamping bolt 19. The member 18 supports a fulcrum finger 20 which is also adjustable vertically by means of the bolt 21.

The cutting tool 17 is set up in a position with its axis below the axis of the hex supporting bar with the face 22 of one of the cutting tool teeth resting on the fulcrum 20 in line with the horizontal axis of the grinding wheel 23. The cutting tool is then rotated against the grinding wheel with the tooth face pivoting on the fulcrum rest 20 causing the axis of the cutting tool to move upwardly as the tool is rotated causing a convex receding face to be ground on the cutting tool tooth. This receding face can be increased or decreased to the desired amount of relief required for the specific tool by changing the relative horizontal distance between the axes of the hex bar and that of the grinding wheel. If a greater relief is desired, the axis of the hex bar is raised in relation to the axis of the grinding wheel. With this method of grinding, a greater degree of accuracy can be maintained in the concentricity of the cutting tool.

Having thus fully described my invention, what I claim as new and desire to secure by Letters Patent, is:

1. A device for generating a convex receding face from the cutting edges on the teeth of a cutting tool comprising a fixture, a pair of arms each mounted on the fixture for pivotal movement on a common pivotal axis, center means on the free ends of the arms for rotatably mounting a cutting tool on an axis spaced from and parallel to the common pivotal axis of the arms, a grinding wheel having a fixed line of surface contact with the tool, a fulcrum rest mounted on the fixture adjacent the grinding wheel surface and adapted to engage a side face of each tooth of said cutting tool, the axis of rotation of the cutting tool being initially disposed on one side of the center line containing the grinding wheel surface at the line of contact with the tool and the common pivotal axis of the arms whereby upon rotation of the cutting tool on the fulcrum rest and simultaneous pivotal movement of the arms on their common pivotal axis the tool is fed toward the grinding wheel surface by the arms.

2. A device for generating a convex receding face from the cutting edges of the teeth on a cutting tool comprising a fixture, a tool holder pivotally mounted on the fixture, means for rotatably mounting a cutting tool on the holder on an axis spaced from and parallel to the pivotal axis of the tool holder for swinging movement laterally of its axis of rotation, a grinding wheel having a fixed line of surface contact with the tool, a fulcrum rest mounted on the fixture adjacent the grinding wheel surface and adapted to engage the side of a tooth of said cutting tool, the axis of rotation of the cutting tool being initialy disposed on one side of a center line containing the grinding wheel surface at the line of contact with the tool and the pivotal counting of the holder whereby upon rotation of the cutting tool on the fulcrum rest the cutting tool is fed toward the grinding wheel surface by the holder.

References Cited in the file of this patent

UNITED STATES PATENTS

| 76,301 | Carrington | Apr. 7, 1868 |
|---|---|---|
| 563,105 | Vivarttas | June 30, 1896 |
| 1,379,853 | Cogsdill | May 31, 1921 |
| 1,897,035 | Anderson | Feb. 14, 1933 |
| 2,145,202 | Ricenmann | Jan. 24, 1939 |

FOREIGN PATENTS

| 575,984 | Great Britain | Mar. 13, 1946 |

UNITED STATES PATENT OFFICE
CERTIFICATE OF CORRECTION

Patent No. 2,852,894                                       September 23, 1958

Andrew J. Bryant

It is hereby certified that error appears in the printed specification of the above numbered patent requiring correction and that the said Letters Patent should read as corrected below.

Column 2, line 49, for "counting" read -- mounting --.

Signed and sealed this 25th day of November 1958.

(SEAL)
Attest:

KARL H. AXLINE
Attesting Officer

ROBERT C. WATSON
                                                     Commissioner of Patents